United States Patent [19]

Eyrard et al.

[11] 4,330,585
[45] May 18, 1982

[54] CYLINDER-HEAD GASKET AND METHOD OF MAKING SAME

[75] Inventors: Pierre Eyrard, Lyons; Jean-Paul Poquet, Caluire, both of France

[73] Assignee: Curty, Société Anonyme, Saint-Priest, France

[21] Appl. No.: 202,233

[22] Filed: Oct. 30, 1980

[30] Foreign Application Priority Data

Oct. 31, 1979 [FR] France .................. 79 27394

[51] Int. Cl.³ .................. B32B 3/10; F16J 15/12
[52] U.S. Cl. .................. 428/131; 156/252; 156/253; 156/330; 277/235 R; 277/235 B; 428/137
[58] Field of Search .................. 428/131, 132, 137; 156/252, 253, 330; 277/235 R, 235 A, 235 B

[56] References Cited

U.S. PATENT DOCUMENTS

| 4,049,856 | 9/1977 | Adams | 428/132 |
| 4,083,570 | 4/1978 | Sugawara | 277/235 B |
| 4,243,231 | 1/1981 | Sugawara | 277/235 B |
| 4,254,963 | 3/1981 | Skrycki | 277/235 R |
| 4,272,085 | 6/1981 | Fujikawa et al. | 277/235 B |

Primary Examiner—William J. Van Balen
Attorney, Agent, or Firm—Karl F. Ross

[57] ABSTRACT

A cylinder-head gasket has an elongated compressible heat-resistant sheet having a longitudinally extending succession of circular cylinder holes. Respective U-section sheet-metal rings are gripped over the edges of these holes on the sheet. Respective sections of reinforcement material are engaged between these rings and the sheet in a longitudinally extending central region of the sheet that has a width smaller than the diameter of the cylinder holes. The reinforcement material is different from the sheet metal of the rings and is heat resistant.

12 Claims, 5 Drawing Figures

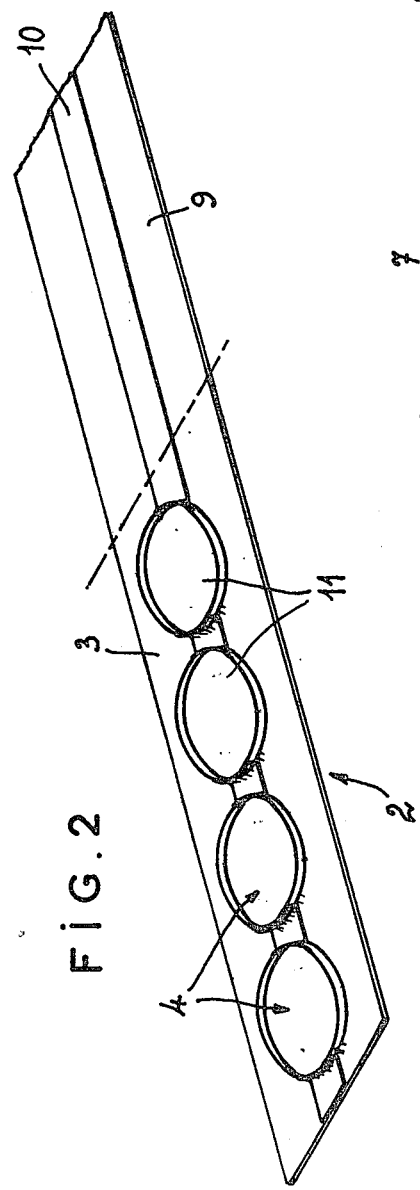
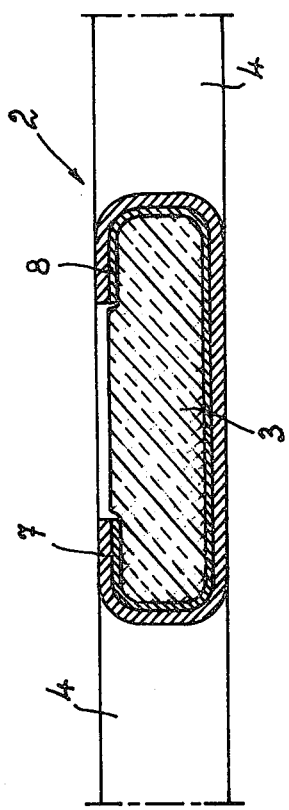
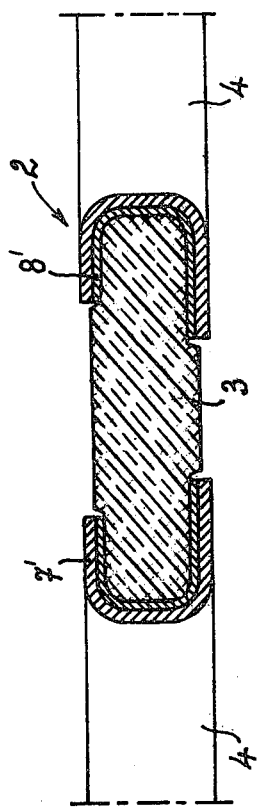

1

CYLINDER-HEAD GASKET AND METHOD OF MAKING SAME

FIELD OF THE INVENTION

The present invention relates to a cylinder-head gasket of the type clamped between the cylinder head and engine block in an internal-combustion engine.

BACKGROUND OF THE INVENTION

A cylinder-head gasket is compressed between the cylinder head and engine block of an internal-combustion engine to prevent leaks at this joint. Normally such a cylinder head is made of a compressed mass of heat-resistant material such as asbestos. Holes are formed in this sheet of asbestos material for the passage of liquid and oil in the motor block as well as for the cylinders which must pass through the gasket.

In order to prevent leakage at the critical region around the edges of the cylinder holes it is known to provide such a gasket at its cylinder holes with rings of reinforcement material. These rings are of outwardly open U-section and are gripped over the edges of the cylinder holes. They greatly increase the resistance of the gasket to rupture.

Normally such a reinforced gasket is relatively effective. It is clamped between the longitudinally extending cylinder head and engine block by bolts normally provided around the periphery of these two elements. As a result of this style of clamping the gasket head and the way in which the engine block and cylinder head normally deform when heated and under pressure, the most common accident is for the cylinder gasket to blow out between adjacent cylinders. Such a blowout reduces pressure in the two cylinders that are thus interconnected and requires a costly overhaul of the engine.

The only solution proposed to this problem has been to yet again reinforce the rings by making them substantially thicker. The result has not, however, been a substantial decrease in the number of blowouts between adjacent cylinder holes. Although a thicker reinforcement ring does generally prevent damage at the cylinder holes, the blowout between adjacent cylinder holes is still the most frequent accident.

OBJECTS OF THE INVENTION

It is therefore an object of the instant invention to provide an improved cylinder-head gasket.

Another object is to provide an improved method of making such a gasket.

Yet another object is to provide such a gasket and method of making same which substantially reduces the likelihood of blowout between adjacent cylinders in an engine thus equipped.

SUMMARY OF THE INVENTION

These objects are attained according to the instant invention in a cylinder-head gasket of the above-described general type, but wherein respective sections of reinforcement material are engaged between the rings and the sheet in the longitudinally extending central region of the sheet. This region has a width smaller than the diameter of the cylinder holes. The reinforcement material is different from the sheet metal of the rings and is heat resistant, capable of resisting the same heat and pressure as it will be subjected to at the hole-edge regions.

According to further features of this invention the reinforcements are also U-shaped and completely underlie the rings. Thus as a result of their being provided at the critical central or middle region of the gasket where blowout is most likely to occur the overall resistance to blowout at these critical regions is greatly enhanced.

According to other features of the invention the reinforcement material may be a good conductor of heat such as a metal. Copper, aluminum, steel, brass, or aluminum may be used. The thickness is normally between 0.02 mm and 0.15 mm. In an arrangement wherein the rings are all formed by a common piece of material, the reinforcement material may simply be laminated down the center of the strip of material ultimately formed into the rings.

In a situation where individual rings are fitted to the holes in the cylinder gasket it is advantageous to laminate the reinforcement material as a strip down the center of the cylinder gasket before its holes are punched. In this case the layer may be a thermoplastic or thermosetting, but in either case heat-resistant, synthetic resin. An epoxy mixed with powder such as silica or barium sulfate is advantageous, with a mixture of 80-100 parts of the epoxy resin for 100-120 parts of the powder aggregate. Using such an aggregate in an epoxy resin greatly increases its heat resistance.

Thus it is a fairly simple matter to make the gasket according to the instant invention. Either the reinforcement material is laminated down a strip of material that is eventually shaped into the rings, or the reinforcement material is laminated as a strip down the center of the asbestos sheet forming the gasket.

DESCRIPTION OF THE DRAWING

FIG. 2 is a perspective view illustrating how the head gasket of FIG. 1 is constructed;

FIG. 3 is a section taken along the line III—III of FIG. 1;

FIG. 5 is a section taken along line V—V of FIG. 4.

SPECIFIC DESCRIPTION

Figure 1:
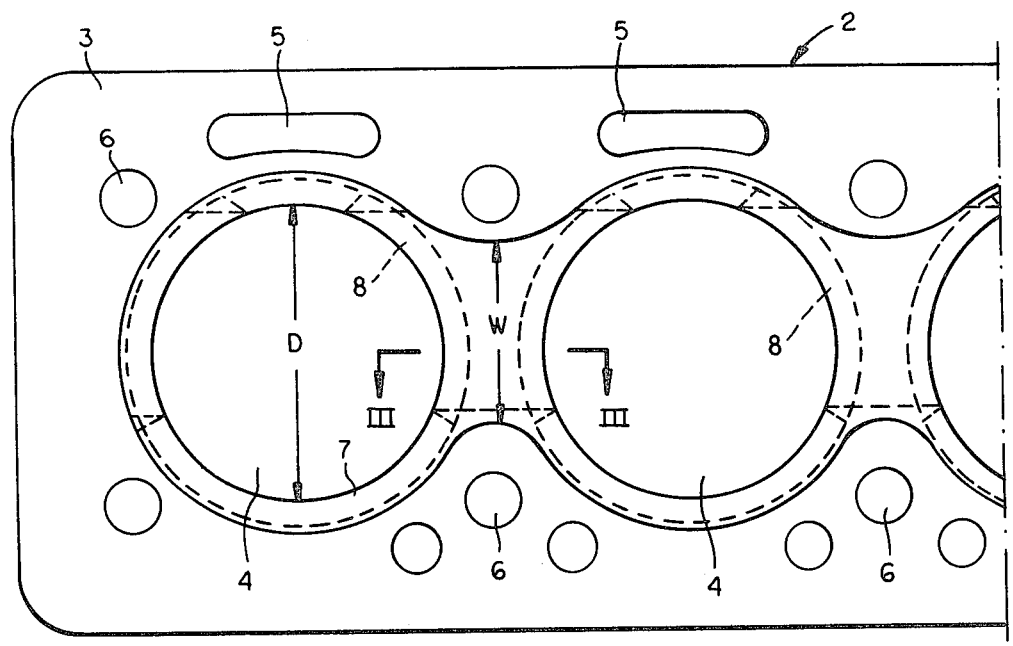
FIG. 1 is a top view of a portion of a head gasket according to the instant invention.

As shown in FIGS. 1 and 2 a head gasket 2 according to the instant invention basically comprises an asbestos-cardboard sheet 3 of elongated rectangular shape and formed down its middle, that is along its longitudinal center line, with a succession of identical circular cylinder holes 4. Flanking these cylinder holes 4 are holes 5 for passage of water or oil, and bolt holes 6 through which the bolts that secure the head to the block pass. These bolt holes 6 are arranged in square arrays substantially centered on the centers of the respective cylinder holes 4. Each of these holes 4 is provided with a reinforcement ring 7 which is of U-section and which grips the edge of the asbestos sheet 3 around the edges of the holes 4 as best seen in FIG. 3. Steel is normally employed for the rings 7.

According to the instant invention a reinforcement strip 8 is provided which runs down the center of the sheet 3 and which has a width W substantially smaller than the diameter D of the holes 4. This reinforcement strip 8 is made of any of several materials such as copper, aluminum, stainless steel, brass, steel plated with aluminum, galvanized steel, tin steel, or otherwise coated steel. Here copper is used for its excellent heat conduction.

In order to make such a head gasket a strip 10 of the reinforcement material is applied as shown in FIG. 2 to an unpunched piece 9 of the asbestos cardboard used to make the head gasket. This copper strip 10 has a thickness of approximately 0.05 mm. Holes 11 are punched in the sheet 9, of a diameter slightly greater than the diameter D. Then L-section rings are fitted through these holes and crimped over to form the U-section rings shown at 7.

Figure 4:
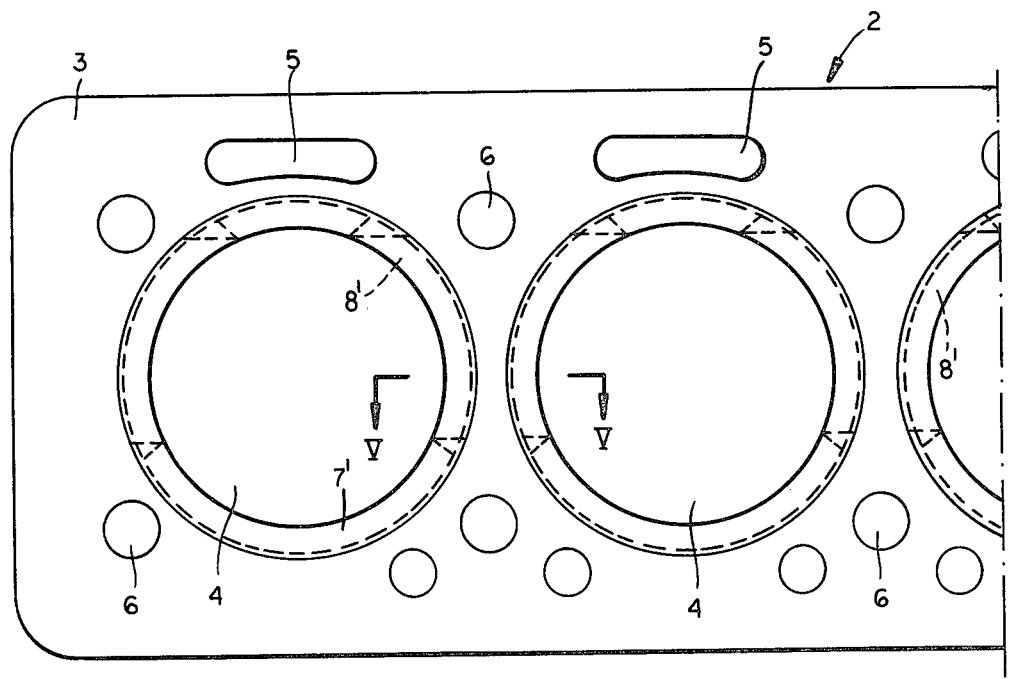
FIG. 4 is a view similar to FIG. 3 illustrating another head gasket according to this invention.

It is also possible as shown in FIGS. 4 and 5 to employ separate rings 7' not all formed of the same piece of material and separate sections 8 of the reinforcement material. To achieve this effect the reinforcing material is laminated inside the sheet metal forming the rings 7'. According to this invention 80–100 parts of epoxy resin are mixed with 100–120 parts of an aggregate such as a silica powder or barium sulfate. The rings 7' are then crimped around the edges of the holes 4 to reinforce them.

We claim:

1. A cylinder-head gasket comprising:
   an elongated compressible heat-resistant sheet having a longitudinally extending succession of circular cylinder holes having edges;
   respective U-section sheet-metal rings gripped over said edges of said holes of said sheet; and
   respective sections of reinforcement material engaged between said rings and said sheet in a longitudinally extending central region of said sheet having a width smaller than the diameter of said cylinder holes, said material being different from the sheet metal of said rings and heat resistant.

2. The gasket defined in claim 1 wherein said material is copper, brass, steel, or aluminum.

3. The gasket defined in claim 1 wherein said sections are laminated with said sheet.

4. The gasket defined in claim 1 wherein said material is a foil having a thickness between 0.002 mm and 0.15 mm.

5. The gasket defined in claim 1 wherein said material is a highly heat-resistant synthetic resin applied to said sections.

6. The gasket defined in claim 5 wherein said resin is an epoxy resin mixed with silica or barium-sulfate powder with between 50% and 80% by weight epoxy.

7. In a method of making a cylinder-head gasket wherein U-section sheet-metal rings are gripped over the edges of circular cylinder holes longitudinally aligned down the middle of an elongated compressible heat-resistant sheet, the improvement comprising the step of fitting between said rings and said sheet in a longitudinally extending central region of said sheet having a width smaller than the diameter of said holes heat-resistant material different from the sheet metal of said rings.

8. The method defined in claim 7 wherein said material is laminated on said sheet metal of said rings prior to gripping of same over said edges.

9. The method defined in claim 8 wherein said material is heat-resistant epoxy resin.

10. The method defined in claim 7 wherein said material is laminated on said sheet prior to gripping of said rings over said edges.

11. The method defined in claim 10 wherein said material is a metal.

12. The method defined in claim 10 wherein said material is laminated on said sheet and then said holes are punched through said sheet and the material lamina thereon.

* * * * *